(12) United States Patent
Fassiau et al.

(10) Patent No.: US 8,053,550 B2
(45) Date of Patent: Nov. 8, 2011

(54) PROCESS FOR THE PURIFICATION FROM HEAVY METALS OF VINYL CHLORIDE POLYMERS

(75) Inventors: Eric Fassiau, Brussels (BE); Murielle Manin, Grenoble (FR)

(73) Assignee: Solvay (Societe Anonyme), Brussels (BE)

( * ) Notice: Subject to any disclaimer, the term of this patent is extended or adjusted under 35 U.S.C. 154(b) by 293 days.

(21) Appl. No.: 11/719,825

(22) PCT Filed: Nov. 21, 2005

(86) PCT No.: PCT/EP2005/056112
§ 371 (c)(1),
(2), (4) Date: Oct. 1, 2007

(87) PCT Pub. No.: WO2006/069856
PCT Pub. Date: Jul. 6, 2006

(65) Prior Publication Data
US 2009/0149619 A1    Jun. 11, 2009

(30) Foreign Application Priority Data
Nov. 22, 2004 (FR) .................... 04 12359

(51) Int. Cl.
*C08C 1/14* (2006.01)
(52) U.S. Cl. ........ 528/488; 528/480; 528/489; 528/491; 528/499; 528/500; 528/502 E; 521/45; 521/46; 521/46.5
(58) Field of Classification Search ........... 521/40, 521/40.5, 41, 48, 44, 45, 46, 46.5; 528/480, 528/271, 272, 300, 481, 488, 489, 499, 502 A, 528/502 D, 502 E, 502 R, 503, 482, 491, 528/500
See application file for complete search history.

(56) References Cited

U.S. PATENT DOCUMENTS

| | | | |
|---|---|---|---|
| 2,915,482 A | 12/1959 | Nagle et al. | |
| 4,071,479 A * | 1/1978 | Broyde et al. | 521/46.5 |
| 5,008,031 A * | 4/1991 | Schulz et al. | 510/338 |
| 5,674,914 A | 10/1997 | Abe et al. | |
| 2003/0119925 A1 * | 6/2003 | Vandenhende et al. | 521/40 |
| 2005/0010027 A1 | 1/2005 | Vandenhende et al. | |
| 2005/0077640 A1 | 4/2005 | Fassiau et al. | |
| 2006/0173085 A1 | 8/2006 | Fassiau et al. | |
| 2006/0173086 A1 | 8/2006 | Fassaiau et al. | |
| 2006/0194913 A1 | 8/2006 | Pleska et al. | |

FOREIGN PATENT DOCUMENTS

| | | |
|---|---|---|
| EP | 0 945 481 | 9/1999 |
| EP | 1232204 | 8/2002 |
| EP | 1456281 | 9/2004 |
| FR | 2 857 670 | 1/2005 |
| FR | 2857 669 | 1/2005 |
| WO | 2005 100461 | 10/2005 |

OTHER PUBLICATIONS

U.S. Appl. No. 12/063,710, filed Feb. 13, 2008, Fassiau, et al.
Van Krevelen, D. W.,"Properties of Polymers", pp. 200-202, 1990 edition.
Brandrup, J. et al., Editors,"Polymer Handbook", pp. IV-337 and IV-359, Second Edition.
U.S. Appl. No. 11/578,347, filed Oct. 12, 2006, Vandenhende.
U.S. Appl. No. 11/578,522, filed Oct. 16, 2006, Vandenhende et al.
U.S. Appl. No. 11/719,714, filed May. 18, 2007, Fassiau et al.
U.S. Appl. No. 11/719,255, filed May 14, 2007, Vandenhende.
U.S. Appl. No. 12/990,929, filed Nov. 3, 2010, Van Weynbergh, et al.

* cited by examiner

Primary Examiner — James J Seidleck
Assistant Examiner — Frances Tischler
(74) Attorney, Agent, or Firm — Oblon, Spivak, McClelland, Maier & Neustadt, L.L.P.

(57) ABSTRACT

Process for the purification of a vinyl chloride polymer (PVC) comprising at least one compound of a heavy metal, according to which: (a) the PVC is dissolved in a water-miscible polar organic solvent; (b) an aqueous solution comprising a reagent, which is either a base capable of reacting with the compound of the heavy metal (R1) or a dispersing agent capable of stabilizing the said compound (R2), is added to the organic solution, the water being introduced in an amount (Q) such that it brings about the formation of a two-phase medium, the continuous phase of which is the organic phase; (c) the two-phase medium is subjected to stirring for a time sufficient for the reagent to be able to interact with (exert its effect on) the compound of the heavy metal; (d) the precipitation of the PVC out of this two-phase medium is brought about.

20 Claims, No Drawings

PROCESS FOR THE PURIFICATION FROM HEAVY METALS OF VINYL CHLORIDE POLYMERS

This application is a 371 of PCT/EP05/56112, filed Nov. 21, 2005.

The present invention relates to a process for the purification from heavy metals (mainly Pb and Cd) of vinyl chloride polymers (PVC) and more particularly to a process for the recycling of articles based on PVC comprising heavy metals.

These polymers are widely used in the manufacture of varied flexible or rigid articles, such as, for example, tarpaulins, coated fabrics and other components for the interior trim of vehicles, pipes, window frames or electrical cables comprising polymeric insulation.

However, heavy metals are the subject of increasingly strict environmental legislation targeted at limiting/banning the use thereof in an increasing number of applications. As regards the plastics sector and in particular PVC, constantly changing legislation is targeted at limiting the Cd and Pb content thereof. In point of fact, the majority of former and current waste based on PVC has Pb or Cd contents which are typically of the order of (some tens of) thousands of ppm, which is beyond the target (at least for the future). In order to be able to be reused in a future application, the recycled PVC resins resulting from this waste will thus have to be treated so as to drastically reduce the heavy metals content thereof.

U.S. Pat. No. 2,915,482 discloses a process for the removal of pigments (based on heavy metals) present in a polymeric solution (preferably based on polystyrene or another vinylaromatic polymer) by liquid-liquid extraction using an aqueous phase comprising a water-soluble aliphatic amine. However, in this process, the organic phase is separated from the aqueous phase before the precipitation of the polymer in order to prevent the extracted metals present in the aqueous phase from precipitating in conjunction with the polymer. This is because it is generally accepted (see in particular Patents EP 0 945 481 and 1 232 204 on behalf of the Applicant Company) that such a coprecipitation actually occurs.

However, in the case where the polymer is PVC and in the event of the chosen solvent being only slightly miscible with water (which is the case with the polar organic solvents which are generally the most effective with PVC), the separation of the organic and aqueous phases is difficult to carry out. In point of fact, the Applicant Company has found that, surprisingly, the abovementioned coprecipitation did not occur in a two-phase medium resulting from an extraction provided that the extraction agent is appropriately chosen.

Consequently, the present invention relates to a process for the purification of a vinyl chloride polymer (PVC) comprising at least one compound of a heavy metal, according to which:
(a) the PVC is dissolved in a water-miscible polar organic solvent;
(b) an aqueous solution comprising a reagent, which is either a base capable of reacting with the compound of the heavy metal (R1) or a dispersing agent capable of stabilizing the said compound in the water (R2), is added to the organic solution, the water being introduced in an amount (Q) such that it brings about the formation of a two-phase medium, the continuous phase of which is the organic phase;
(c) the two-phase medium is subjected to stirring for a time sufficient for the reagent to be able to interact with (exert its effect on) the compound of the heavy metal;
(d) the precipitation of the PVC out of this two-phase medium is brought about.

The PVC which can be treated by the process according to the invention can result from articles of any nature, provided that they comprise PVC and heavy metal compounds.

These articles can exist in any form, for example in the form of granules, of powder, of flexible or rigid pipes, of containers, of sheets for the covering of soils, of tarpaulins, of window frames, of insulating sleeves for electrical cables, and the like. They may have been manufactured by any known technique: extrusion, coating, injection moulding, and the like.

The articles do not necessarily have to exist in the form of objects exhibiting a well defined form; the process also applies to articles in the liquid or pasty state, in particular to sludges collected during the cleaning of plants used for the manufacture of articles from vinyl plastisols. In addition to one or more vinyl chloride polymers, these articles in the liquid or pasty state can also comprise one or more solvents, for example white spirit.

A stage preliminary to the process according to the invention consists, if necessary, in shredding the articles, so as to reduce them to fragments of reduced size (for example of less than 2 cm) which are easy to handle. This shredding can be carried out using any appropriate device, for example using a rotary knife mill or a shear mill. It is clear that, if the article already exists in the form of fragments of appropriate dimensions, the shredding stage is superfluous. In some cases it may be useful to subject the fragments of articles thus obtained to an intermediate separating stage which makes it possible to remove, by conventional techniques, such as flotation or electrostatic separation, possible constituents other than PVC.

According to the invention, the PVC resulting from these articles is subjected to the action of an appropriate solvent capable of dissolving it. This dissolution can be carried out in any appropriate device, taking into account in particular safety and environmental requirements, for example in a closed reactor exhibiting satisfactory chemical resistance. The reaction medium is preferably stirred. In order to prevent possible reinforcing components/contaminants (for example metal ones in the case of cable waste) from hanging on to the stirring means and from interfering with the operation thereof, an advantageous alternative form consists in carrying out the dissolution in a vessel in which a perforated rotating drum is positioned, which drum rotates at a moderate speed (preferably at less than 100 rpm), and/or in removing the said reinforcing components/contaminants by filtration or any other appropriate means before the treatment for purification of the solution from heavy metals. These techniques can also be applied in the case where articles comprising polymer(s) other than PVC which is (are) insoluble in the chosen solvent would be treated directly.

The term "PVC" is intended to denote any homo- or copolymer comprising at least 50% by weight of vinyl chloride (VC). Use is generally made of poly(vinyl chloride) (PVC homopolymer) or of a copolymer with vinyl acetate or any other appropriate monomer. In addition to one or more VC polymers, these articles can also comprise one or more conventional additives, such as, for example, plasticizers, antioxidants, flame retardants, pigments, fillers, and the like, including reinforcing fibres, for example fibres of glass or of an appropriate plastic, such as a polyester.

The term "heavy metal compounds" is understood to mean the compounds of metals which are subject to regulations, in particular with regard to their discharge to the environment: As, Cd, Cr, Hg, Pb, and the like. In the context of the invention, it is the organic and inorganic compounds of Pb and of Cd which are the most widely used in PVC formulations. These can be used in PVC as pigments, stabilizers, and the like, and other conventional additives. The present invention gives excellent results with Pb compounds.

The polar organic solvent capable of dissolving the PVC is preferably chosen from those having a solubility parameter (a definition of which and experimental values for which appear in "Properties of Polymers", D. W. Van Krevelen, 1990 edition, pp. 200-202, and in "Polymer Handbook", J. Brandrup and E. H. Immergut, Editors, Second Edition, p. IV-337 to IV-359) close to that of PVC and/or exhibiting strong interactions with the latter. The term "close" is generally equivalent to "not differing by more than 6 units". It is preferably a solvent chosen from cyclohexanone, methyl ethyl ketone (MEK), methyl isobutyl ketone and tetrahydrofuran, solvents capable of forming an azeotrope with water. Preference is given to the use of MEK, which forms an azeotrope with water comprising (under atmospheric pressure) 11% of water and 89% of MEK (by weight).

The dissolution of the PVC is carried out under a pressure determined by the temperature. Generally, it is preferable to operate under hot conditions and under pressure, that is to say at a temperature and a pressure which are greater than the ambient values. The temperature can reach, indeed even exceed, 100° C., indeed even 120° C. In general, the associated pressure is at least 2 bar, indeed even at least 4 bar. Advantageously, the pressure does not exceed 10 bar.

In addition, it is advantageous to operate under an inert atmosphere, for example under nitrogen, to avoid any risk of explosion and of decomposition of the solvent.

The amount of solvent to be used must be chosen so as to avoid the increase in viscosity brought about by the dissolution of the PVC from interfering with the satisfactory progression of the process (filtration, extraction, and the like). In the process according to the invention, one can generally work with polymer concentrations higher or equal to 100 g/l of solvent, even to 250 g/l and even, 300 g/l. However, the polymer content does not typically exceed 500 g/l, even 400 g/l. It has been noted that the residual contents of heavy metals appear to be lower when more dilute PVC solutions are treated.

According to one alternative form of the invention, a phase separation agent is added to the organic solution, the aim of the phase separation agent being to render it more hydrophobic (both before and after the dissolution) (that is to say, to see to it that the organic solution tolerates less water (i.e., for example, not more than 8%, indeed even 7% and even 6%) before becoming two-phase). This alternative form gives good results with MEK (methyl ethyl ketone) as solvent and an aliphatic hydrocarbon having from 5 to 7 carbon atoms as phase separation agent. Excellent results have been obtained by choosing n-hexane or isohexane as phase separation agent.

According to the invention, an aqueous solution is added to the organic solution (rendered or not rendered more hydrophobic), via which aqueous solution water is introduced in an amount, described as "Q" below, such that it brings about the formation of a two-phase medium without bringing about phase inversion. This is because, during the addition of water to the organic PVC solution, there is first observed, after having added a certain amount of water, the formation of a two-phase medium in which the continuous phase is the organic phase and the dispersed phase is the aqueous phase. After having added a certain additional amount of water, phase inversion then occurs, that is to say that the continuous phase becomes the aqueous phase (and the dispersed phase becomes the organic phase). Consequently, according to the invention, the water cannot be introduced in an excessively large amount for fear of bringing about phase inversion and, doing this, of interfering with the extraction.

Among the reagents of R1 type (bases), sodium hydroxide and potassium hydroxide give good results. In the case in particular of Pb, NaOH gives good results.

Among the reagents of R2 type (dispersing agents/chelating agents), mention may be made of EDTA (ethylenediaminetetraacetic acid) and its sodium salts ($Na_4EDTA$, $Na_3EDTA$, $Na_2EDTA$, NaEDTA), and also Na polyphosphates (NaPP) (hexametaphosphate, Na polytriphosphate (NaPTP)). The latter gives good results both with Pb compounds and with Cd compounds.

The temperature of the aqueous phase and the amount of reagent are to be adjusted, in particular according to the amount of PVC to be purified, so as to optimize the result obtained. Generally, at equal contents of PVC in solution, a higher content of reagent and a higher temperature promote the reaction (stabilization) with (the) heavy metals. As with the dissolution, the pressure of the treatment with the aqueous phase is generally conditioned by the temperature. The duration of the reaction (stabilization) has to be sufficient for the latter to be substantially complete. It is generally at least a few minutes, indeed even at least ½ hour.

According to the invention, during the reaction (stabilization), the two-phase medium is subjected to stirring in order to bring about the interaction between the reagent present in the aqueous phase and the heavy metals present in the organic phase. This stirring is preferably maintained up to the end of the reaction. It can be carried out by any appropriate means. Good results have been obtained with a stirrer of propeller type in a reactor equipped with baffles (2 to 4) which rotates at several hundred revolutions/min (rpm) (typically at more than 300 rpm, indeed even at more than 400 and even 500 rpm) and which brings about turbulent conditions throughout the reactor.

Before bringing about the precipitation of the PVC, it may prove to be advantageous to leave the two-phase medium to stand for at least a few minutes at ambient temperature or slightly above ambient temperature (between 40 and 60° C., for example). However, in this case, the medium will preferably be rehomogenized by stirring before the precipitation of the PVC.

In the case of a solvent capable of forming an azeotrope with water, the precipitation can take place by addition of vapour (of pure water or of azeotropic composition) to a two-phase medium (in order to bring about azeotropic distillation of the solvent), this being done as disclosed in Patents EP 0 945 481 and 1 232 204 on behalf of the Applicant Company. Various improvements to this process, also patented by the Applicant Company, can be applied (recourse to a mixture of dispersing agents: Patent Application FR 03/08690; prior addition of liquid water in order to achieve phase inversion: FR 03/08691; removal of the phase separation agent before precipitation: FR 04101559.5). On conclusion of the azeotropic distillation, the polymer particles (agglomerates) can be easily collected, for example by filtration of the water/particles mixture, and optionally dried before being stored or reused. The residual water is advantageously purified in order to remove therefrom the dissolved constituents, such as emulsifiers or others.

Alternatively to the azeotropic distillation, the PVC can be recovered by atomization of the two-phase medium, as claimed in Patent Application EP 1 456 281, also on behalf of the Applicant Company. It is in that case preferable, as disclosed in the patent application, to preprecipitate the PVC by addition of water before carrying out the atomization of the medium.

The technical content of all the abovementioned patent applications is incorporated by reference in the present patent application. The azeotropic distillation of the solvent gives good results.

In addition, the Applicant Company has found that recourse to reagents of R1 and R2 type used in cascade (that is to say, the fact of subjecting the PVC solution resulting from stage (a) to the consecutive action of a reagent of R1 type and then of a reagent of R2 type, or vice versa) gave excellent results, in particular when a phase inversion (and preferably even intermediate precipitation of the PVC) was applied. In particular, the use of the NaOH/NaPTP pair gives good results with Pb compounds. The joint use of the 2 reagents gives poorer results than their use in cascade, probably due to an interaction (reaction) between reagents.

Thus, according to a first preferred alternative form, the following stages are inserted between stages (c) and (d) of the process described above:
(c1) an amount of water sufficient to bring about the phase inversion of the two-phase medium is added thereto and separation by settling is allowed to take place;
(c2) the organic phase (PVC solution) is collected and the PVC concentration thereof is adjusted by addition of solvent;
(c3) an aqueous solution comprising either a reagent of the R1 type, if a reagent of R2 type has been used in stage (c), or a reagent of R2 type, if a reagent of R1 type has been used in stage (c), is added to the PVC solution, the water being introduced in an amount (Q) defined above;
(c4) the two-phase medium is subjected to stirring for a time sufficient for the reagent to be able to interact with (exert its effect on) the heavy metal compounds.

According to this alternative form, it is specifically necessary to add more solvent to the organic phase as a certain amount of solvent has been extracted by the discarded aqueous phase.

According to a second alternative form which is particularly advantageous, stages (c1) and (c2) above are replaced with the following stages:
(c1') an amount of water sufficient to precipitate the PVC is added;
(c1") the precipitated PVC is separated from the medium and is rinsed;
(c2') the rinsed PVC is redissolved in solvent.

In this alternative form, the rinsing is preferably carried out in hot water (brought to a temperature of 70 to 100° C.) and with stirring, at least for a few minutes (approximately ten minutes, indeed even ¼ to ½ hour).

In each of these 2 alternative forms, the water (in order to bring about respectively the phase inversion or the precipitation of the PVC) is preferably added in the form of vapour (either of pure water or of the water/solvent azeotrope) and, in this case, it is capable of bringing about a change in the composition of the medium which may necessitate an extra contribution of solvent.

In the case where the PVC comprises organic compounds of the heavy metals and in particular of Pb, better results can be obtained using first (in stage (b)) a reagent of R1 type and then (in stage (c3)) a reagent of R2 type.

Finally, it should be noted that the solution of stage (a) can be subjected to a purification treatment prior to stage (b) of the process according to the invention. Thus, according to an alternative form, the following stages are inserted between stages (a) and (b):
(a1) the solution is treated with at least one additive capable of adsorbing or forming complexes with the compound of the heavy metal;
(a2) the treated solution is subjected to centrifuging, so as to precipitate the adsorbed or complexed compound of the heavy metal; and
(a3) the precipitate is separated from the PVC solution.

Given the cost of the solvent involved in the process according to the invention and the disadvantages which would be presented by its discharge to the environment, it is desirable to recycle it on conclusion of the precipitation/atomization stage. The way in which this recycling is carried out is disclosed in the abovementioned corresponding patent applications.

The process according to the invention can be carried out continuously or batchwise, it being understood that a continuous process is often more economical.

One advantage of the process according to the invention is that it can operate in a closed loop, without generating contaminating discharges, given that both the solvent, on the one hand, and the reagent(s) and the optional other additives used (phase separation agent, for example), on the other hand, can be recycled and reused in the process. In this case, in practice, the solvent used in the dissolution stage is rarely pure; it can in particular comprise a certain amount of nonsolvent (preferably, however, insufficient to bring about the appearance of a second phase), of phase separation agent, and the like, or of any other reagent/additive used in the process. Likewise, the nonsolvent optionally used for the precipitation (optionally at least partially in the vapour form) can comprise a small amount of solvent (and, for example, have a composition close or identical to that of the azeotropic composition).

The process according to the invention is illustrated in a nonlimiting way by the following examples.

Table 1: Purification of a PVC Grade Comprising 20 000 ppm of Pb

The experimental details and the results obtained for this series of tests appear in Table 1 below.

All these tests were carried out according to the same procedure, namely:
1. Dissolution:
  The following:
    PVC: 222.2 g of a formulation comprising a Pb stabilizer (present in particular in the form of tribasic lead sulphate and optionally of lead stearate), plasticizer (DOP or DIDP), fillers ($CaCO_3$), lubricants, and the like,
    MEK: 1778 g, i.e. 2210 ml,
were mixed for 1 h 30 at 75° C. with stirring with a stirrer of propeller type in a reactor equipped with baffles (2 to 4) which rotates at 600 rpm and which brings about turbulent conditions throughout the reactor.

After the dissolution, the insoluble materials were filtered off through a 50 μm mesh size filter.
2. Addition of a Phase Separation Agent:
  The following were introduced, under cold conditions, into a similar reactor:
    PVC solution: 1.78 kg,
    hexane: 310 g.
3. Extraction:
  After homogenizing and raising the temperature (50° C.), the aqueous phase, in the form of:
    distilled water: 725 ml,
    aqueous phase with the reagent: 725 ml,
was introduced with vigorous stirring, as described above (in point 1), and under pressure (1, 1.5 bar) at a temperature varying between 45 and 52° C. (maintained with a jacket) and for a period of time sufficient to carry out the extraction (see table below).

If appropriate, the medium was left to stand at a temperature varying between 40 and 50° C.

4. Precipitation:

Before the precipitation, the medium obtained in the preceding stage was rehomogenized by stirring as described above.

Steam was subsequently injected at 2 bar, still with stirring.

In the event of significant foaming, antifoaming agent (Witco SAG 7133) was added using a pipette.

The injection of steam was halted when the temperature inside the reactor reached 100° C. (distillation of the water). The PVC which has precipitated in the meantime was filtered through a 125 µm filter and then dried in an oven under vacuum at 100° C. for 3 to 4 hours.

4'. Tests with 2 Reactants in Cascade and Intermediate Phase Inversion:

The medium obtained in stage 3 was rehomogenized by stirring (still under the same conditions).

Steam was subsequently injected at 2 bar, still with stirring.

In the event of significant foaming, antifoaming agent (Witco SAG 7133) was added using a pipette.

Injection of steam was halted as soon as a phase inversion was observed (at approximately 55% by volume of aqueous phase).

After separation by settling and withdrawal of the organic phase, a material balance was carried out and the amount of MEK missing and all the hexane were introduced in order to obtain a solution similar to that of stage 2.

Stages 3 and 4 above were repeated with the appropriate reagent.

4". Tests with 2 Reagents in Cascade and Intermediate Precipitation:

Before the precipitation, the medium obtained in the preceding stage was rehomogenized by stirring (still as described above).

Steam was subsequently injected at 2 bar, still with stirring.

In the event of significant foaming, antifoaming agent (Witco SAG 7133) was added using a pipette.

The injection of steam was halted when the temperature inside the reactor reached 100° C. (distillation of the water). The PVC which has precipitated in the meantime was rinsed by addition to the reactor, with stirring, of 4 l of hot water (70 to 100° C.) and was dried.

Stages 1 to 4 above were subsequently repeated.

5. Quantitative Determination of the Pb:

The Pb content of the precipitated PVC was analysed by ICP/OES (Plasma Source Emission Spectrometry).

6. Results Obtained and Experimental Details: Table 1

| Reagent, concentration in the aqueous phase | Residual Pb (ppm) | Duration of extraction (min) | Standing time before precipitation (min) | Amount of antifoaming agent (ml) |
|---|---|---|---|---|
| NaOH, 1M | 1000 | 45 | 95 | 6 |
| Na$_5$P$_3$O$_{10}$, 0.08M | 2000 | 45 | 92 | 6 |
| Na$_5$P$_3$O$_{10}$ (2×) | 2000 | 30 | | 3 |
| Na$_5$P$_3$O$_{10}$, 0.08M + NaOH, 1M | 2000 | 45 | 20 | 3 |
| NaOH, 1M (PVC precipitation), Na$_5$P$_3$O$_{10}$, 0.08M | 300 | 30, 30 | 10, 15 | 6.6 |
| Na$_5$P$_3$O$_{10}$, 0.08M (PVC precipitation), NaOH, 1M | 900 | 30 | 0 | 6 |
| NaOH, 1M (inversion), Na$_5$P$_3$O$_{10}$, 0.08M | 450 | 31, 33 | 16, 6 | 6 |
| Na$_5$P$_3$O$_{10}$, 0.08M (inversion), NaOH, 1M | 410 | 30, 34 | 46, 5 | 6 |

Table 2: Purification of a PVC Grade Comprising 260 ppm of Cd and 110 ppm of Pb

The following procedure was followed:

1. PVC comprising 260 ppm of Cd and 110 ppm of Pb (also comprising plasticizer, fillers and a BaZn stabilizer) was dissolved in pure MEK in a proportion of 250 g in 2500 ml=2011 g.
2. Hexane was optionally added to the solution in a proportion of 538 ml=354 g, if appropriate.
3. Water comprising NaPTP (1.51, 0.1M) was added to the solution.
4. The extraction with stirring as described above was carried out for 45 min.
5. The PVC was precipitated by injection of steam, during which first the hexane was removed, then phase inversion occurred and, finally, stripping (azeotropic distillation) of the MEK occurred;
6. The PVC was recovered by filtration and was rinsed.
7. The residual content of Cd and Pb was quantitatively determined by X-ray fluorescence.

The Following Results were Obtained (Table 2):

| Presence of hexane | Temperature (° C.) | [Residual Gd] ppm | [Residual Pb] ppm |
|---|---|---|---|
| No | 70° C. | 50 | 50 |
| No | 50° C. | 80 | 60 |
| Yes | 50° C. | 60 | 50 |
| Yes | 70° C. | 70 | 60 |

The invention claimed is:

1. A process for the purification of a vinyl chloride polymer (PVC) comprising at least one compound of a heavy metal, comprising, in the order listed:
   (a) dissolving the PVC in a polar organic solvent having a solubility parameter not differing by more than 6 units from that of the PVC to form an organic solution;
   (b) adding an aqueous solution comprising water and a reagent, which reagent is either a base capable of reacting with the compound of the heavy metal or a chelating agent capable of stabilizing said compound of the heavy metal, to the organic solution, the aqueous solution being introduced in an amount such that it brings about the formation of a two-phase medium, a continuous phase of which is an organic phase, a dispersed phase of which is an aqueous phase, without phase inversion and without precipitating the PVC;
   (c) subjecting the two-phase medium to stirring for a time sufficient to cause the reagent to react with or stabilize the compound of the heavy metal and extract the compound of the heavy metal into the aqueous phase without precipitating the PVC; and
   (d) precipitating the PVC out of the two-phase medium.

2. The process according to claim 1, in which a phase separation agent is added to the solution before stage (b).

3. The process according to claim 2, in which the solvent is MEK (methyl ethyl ketone) and the phase separation agent is n-hexane.

4. The process according to claim 1, in which the reagent comprises NaOH.

5. The process according to claim 1, in which the reagent comprises NaPTP (sodium polytriphosphate).

6. The process according to claim 1, in which the solvent is capable of forming an azeotrope with water and in which the precipitation of the PVC in stage (d) takes place by injection of vapour and azeotropic distillation of the solvent.

7. The process according to claim 1, in which the precipitation of the PVC in stage (d) takes place by atomization.

8. The process according to claim 1, in which the organic solution is subjected to the consecutive action of a base and then a chelating agent, or of a chelating agent and then a base, before precipitating the PVC out of the two-phase medium.

9. A process for the purification of a vinyl chloride polymer (PVC) comprising at least one compound of a heavy metal, the process comprising, in the order listed:
- (a) dissolving the PVC in a water-miscible polar organic solvent to form an organic solution;
- (b) adding an aqueous solution comprising water and a reagent, which reagent is either a base capable of reacting with the compound of the heavy metal or a chelating agent capable of stabilizing said compound of the heavy metal, to the organic solution, the aqueous solution being introduced in an amount such that it brings about the formation of a two-phase medium, a continuous phase of which is an organic phase, without precipitating the PVC;
- (c) subjecting the two-phase medium to stirring for a time sufficient to cause the reagent to react with or stabilize the compound of the heavy metal without precipitating the PVC;
- (c1) an amount of water sufficient to bring about phase inversion of the two-phase medium is added thereto and separation by settling is allowed to take place;
- (c2) the organic phase (PVC solution) is collected and the PVC concentration thereof is adjusted by addition of solvent;
- (c3) an aqueous solution comprising water and a reagent which is either a base, if a chelating agent has been used in (c), or a chelating agent, if a base has been used in (c), is added to the PVC solution, the aqueous solution being introduced in an amount such that it brings about the formation of two-phase medium, a continuous phase of which is an organic phase, without precipitating the PVC;
- (c4) the two-phase medium is subjected to stirring for a time sufficient for the reagent to be able to exert its effect on the heavy metal compounds without precipitating the PVC; and
- (d) precipitating the PVC out of the two-phase medium, wherein the organic solution is subjected to the consecutive action of a base and then a chelating agent, or of a chelating agent and then a base, before precipitating the PVC out of the two-phase medium.

10. The process according to claim 9, in which (c1) and (c2) are replaced with the following, in the order listed:
- (c1') an amount of water sufficient to precipitate the PVC is added;
- (c1") the precipitated PVC is separated from the medium and is rinsed;
- (c2') the rinsed PVC is redissolved in solvent.

11. A process for the purification of a vinyl chloride polymer (PVC) comprising at least one compound of a heavy metal, the process comprising, in the order listed:
- (a) dissolving the PVC in a water-miscible polar organic solvent to form an organic solution;
- (b) adding an aqueous solution comprising water and a reagent, which reagent is either a base capable of reacting with the compound of the heavy metal or a chelating agent capable of stabilizing said compound of the heavy metal, to the organic solution, the aqueous solution being introduced in an amount such that it brings about the formation of a two-phase medium, a continuous phase of which is an organic phase, without precipitating the PVC;
- (c) subjecting the two-phase medium to stirring for a time sufficient to cause the reagent to react with or stabilize the compound of the heavy metal without precipitating the PVC; and
- (d) precipitating the PVC out of the two-phase medium
in which the organic solution is subjected to the consecutive action first of a base and then of a chelating agent before precipitating the PVC out of the two-phase medium.

12. The process according to claim 1, in which the following are inserted between (a) and (b), in the order listed:
- (a1) the organic solution is treated with at least one additive capable of adsorbing or of forming complexes with the compound of the heavy metal to form a treated solution;
- (a2) the treated solution is subjected to centrifuging, so as to precipitate the adsorbed or complexed compound of the heavy metal; and
- (a3) the precipitate from (a2) is separated from the organic solution.

13. The process according to claim 1, wherein the solvent is MEK (methyl ethyl ketone).

14. The process according to claim 1, in which the reagent comprises a chelating agent selected form the group consisting of EDTA and its sodium salts.

15. The process according to claim 13, in which the reagent comprises a chelating agent selected form the group consisting of EDTA and its sodium salts.

16. The process according to claim 15, in which the vinyl chloride polymer (PVC) is PVC homopolymer.

17. The process according to claim 1, in which the two-phase medium is subjected to stirring in (c) for more than one minute.

18. The process according to claim 16, in which the two-phase medium is subjected to stirring in (c) for more than one minute.

19. The process according to claim 1, comprising adding an aqueous solution comprising water and a base capable of reacting with the compound of the heavy metal to the organic solution.

20. The process according to claim 1, comprising adding an aqueous solution comprising water and a chelating agent capable of stabilizing said compound of the heavy metal to the organic solution.

* * * * *